United States Patent [19]
Hirasawa et al.

[11] Patent Number: 5,369,803
[45] Date of Patent: Nov. 29, 1994

[54] CAR-MOUNTED BOOSTER FOR PLUG-IN CONNECTION WITH MOBILE TELEPHONE SET

[75] Inventors: Naoki Hirasawa, Tokyo; Shinichi Kobayashi, Saitama, both of Japan

[73] Assignee: NEC Corporation, Tokyo, Japan

[21] Appl. No.: 858,574

[22] Filed: Mar. 27, 1992

[30] Foreign Application Priority Data

Mar. 27, 1991 [JP] Japan .................................. 3-90052

[51] Int. Cl.⁵ ............................................. H04B 1/38
[52] U.S. Cl. ...................................... 455/89; 455/127; 455/282
[58] Field of Search ........................ 455/88, 80, 89, 83, 455/11.1, 101, 127, 131, 280, 281, 282, 293, 345; 379/58, 59

[56] References Cited

U.S. PATENT DOCUMENTS 5,048,117  9/1991  Aisaka et al. ........................ 455/89
5,203,020  5/1993  Sato et al. ........................... 455/68
5,276,918  1/1994  Cornforth et al. .................... 455/89

Primary Examiner—Curtis Kuntz
Assistant Examiner—Chi Pham
Attorney, Agent, or Firm—Sughrue, Mion, Zinn, Macpeak & Seas

[57] ABSTRACT

A car telephone is disclosed that is included in a car telephone system and selectively operable in a car-mounted mode or in a portable mode. A portable unit and a telephone antenna constitute a mobile car telephone set, while a car antenna, a power amplifier unit, a curled cord, and a connection unit constitute a car-mounted telephone together with the portable unit. The car telephone operates in a unique manner in a car-mounted mode. The power amplifier unit converts a received signal from a base station included in the system to an intermediate frequency (IF) signal by a receiving mixer and feeds the IF signal to the curled cord. The IF signal is transferred to a demodulator included in the portable unit over a coaxial cable incorporated in the curled cord and the connection unit. Therefore, the transmission loss of the signal to the portable unit particular to the coaxial cable is noticeably reduced, whereby the constants of the circuits included in the car telephone can be selected with unprecedented freedom.

13 Claims, 3 Drawing Sheets

CAR-MOUNTED BOOSTER FOR PLUG-IN CONNECTION WITH MOBILE TELEPHONE SET

BACKGROUND OF THE INVENTION

1. Field of the Invention

The present invention relates to a car-mounted booster for plug-in connection with a mobile telephone set, or portable unit as referred to hereinafter, included in a cellular car telephone system. More particularly, the present invention is concerned with such a booster which reduces the loss of high frequency signals due to the connection with the portable unit.

2. Description of the Prior Art

A conventional car telephone is selectively operable in a portable mode in which a portable unit is removed from a booster, or in a car-mounted mode in which it is plugged in the booster. In the portable mode, the portable unit uses a built-in telephone antenna for transmission of communication signals. In the car-mounted mode, the portable unit is plugged in a car-mounted apparatus made up of a connection unit, which is removably connected, to the portable unit a curled cord connected to the connection unit by a coaxial cable, a power amplifier unit connected to the curled cord and fixed in place in, for example, a luggage compartment, and a car antenna connected to the power amplifier unit.

In the portable mode, the portable unit modulates a carrier signal generated by a first frequency synthesizer by a communication signal and other signals to thereby produce a first transmit signal to be transmitted. The telephone antenna converts the first transmit signal to a radio frequency (RF) signal and then sends it to a base station. The telephone antenna also functions to convert an RF signal sent from the base station to a first received signal, and a receiving amplifier amplifies the first received signal. A first receiving mixer is included in the portable unit and generates a first intermediate frequency (IF) signal in response to the amplified first received signal and a first local oscillation signal generated by a second frequency synthesizer. A demodulator produces a demodulated signal including a communication signal and other signals from the first IF signal.

When the user connects the portable unit to the connection unit and then turns on booster ON means incorporated in the connection unit, the power amplifier unit is activated to set up the car-mounted mode. Then, the user is capable of holding a conversation with a remote base station using the portable unit as a car telephone. As an RF signal sent from the base station comes in through the car antenna, the power amplifier unit effects low noise amplification with a weak second received signal based on the RF signal by a preamplifier and feeds the amplified second received signal to the portable unit. On receiving a first transmit signal from the portable unit, the power amplifier unit amplifies or boosts the signal using the power amplifier and feeds the resulting second transmit signal to the car antenna. In this manner, the power amplifier unit serves to increase the communicable distance between the car telephone and the base station. The power amplifier unit includes two duplexes, i.e., one on the car antenna side for separating the second transmit signal and the second received signal and the other on the portable unit side for separating the first transmit signal and the second received signal undergone low noise amplification.

The RF signal applicable to the car telephone system lies in, for example, the 800 MHz band as prescribed by AMPS (Advanced Mobile Telephone System), and the transmit signal and the received signal are different in frequency from each other. The received signal fed from the power amplifier unit to the portable unit has the same frequency as the RF signal sent from the base station. The frequency of the IF signal is often selected to be about 90 MHz. Since the curled cord is about 5 meters long, it has to be small size, light weight and, in addition, flexible. To meet these requirements, a high frequency signal transmission cable corresponding to a 1.5D-2 W (or RG-174/U as prescribed by MIL standards) coaxial cable is used for the propagation of the second received signal. With such a coaxial cable, however, the transmission loss of the received signal over the curled cord amounts to about 4.3 dB. Since the loss of received signal due to a high frequency signal transmission cable is substantially proportional to the square root of frequency, the transmission loss ascribable to the curled cord will be further aggravated if the RF signal of a car telephone system is shifted to the 1.5 GHz band, such shift which is now under investigation.

The problem with the conventional car telephone is that the total reception noise factor is low since it compensates for the loss of received signals ascribable to the high frequency signal transmission cable of the curled cord and the two duplexers of the power amplifier unit by increasing the amplification gain of the receiving amplifier of the portable unit. Moreover, since the portable unit has no margins as to the voltage to be supplied, power consumption, and volume, the circuit arrangement of the receiving amplifier and that of the receiving mixer are limited. The receiving mixer, for example, causes intermodulation to occur due to the limited circuit arrangement thereof, thereby degrading the reception characteristics.

BRIEF SUMMARY OF THE INVENTION

OBJECTS OF THE INVENTION

It is, therefore, an object of the present invention to provide a car telephone which reduces the loss of received signals ascribable to the power amplifier unit and the signal loss ascribable to the high frequency signal transmission cable.

It is another object of the present invention to provide a car telephone which enhances the freedom of circuit constant allocation in the power amplifier unit and portable unit.

It is another object of the present invention to provide a car telephone capable of performing reception stably in a car-mounted mode.

Summary of the Invention

The car telephone of the present invention, like a conventional car telephone, has the telephone antenna, portable unit, car antenna, power amplifier unit, connection unit, and curled cord with a coaxial cable.

In the power amplifier, a second receiving mixer follows the preamplifier for converting the second received signal to a second IF signal of the same frequency as the first IF signal. When the power amplifier unit is turned on, the second IF signal is fed to the portable unit via a high frequency signal transmission cable included in the curled cord and the connection unit. The portable unit has switch means which replaces the signal from the first receiving mixer with the second IF signal in response to the turn-on of the power amplifier unit and delivers it to the demodulator.

A second local oscillation signal to be fed to the second receiving mixer may be implemented as a first local oscillation signal which is fed from a first frequency synthesizer for reception over the coaxial cable of the curled cord. Alternatively, the second local oscillation signal may be fed from a third frequency synthesizer incorporated in the power amplifier unit. Then, it is, of course, necessary to control the local oscillation signal of the second frequency synthesizer by a channel control signal which controls the first frequency synthesizer; the control signal is applied to the power amplifier unit via the connection unit and curled cord. The power amplifier unit does not need the previously stated duplexer on the portable unit side since it does not interchange the first transmit signal and second received signal with the portable unit over the same high frequency transmission cable.

BRIEF DESCRIPTION OF THE DRAWINGS

The above-mentioned and other objects, features and advantages of the present invention will become more apparent from the following detailed description taken in conjunction with the accompanying drawings, wherein.

DETAILED DESCRIPTION OF THE PREFERRED EMBODIMENTS

Figure 1:
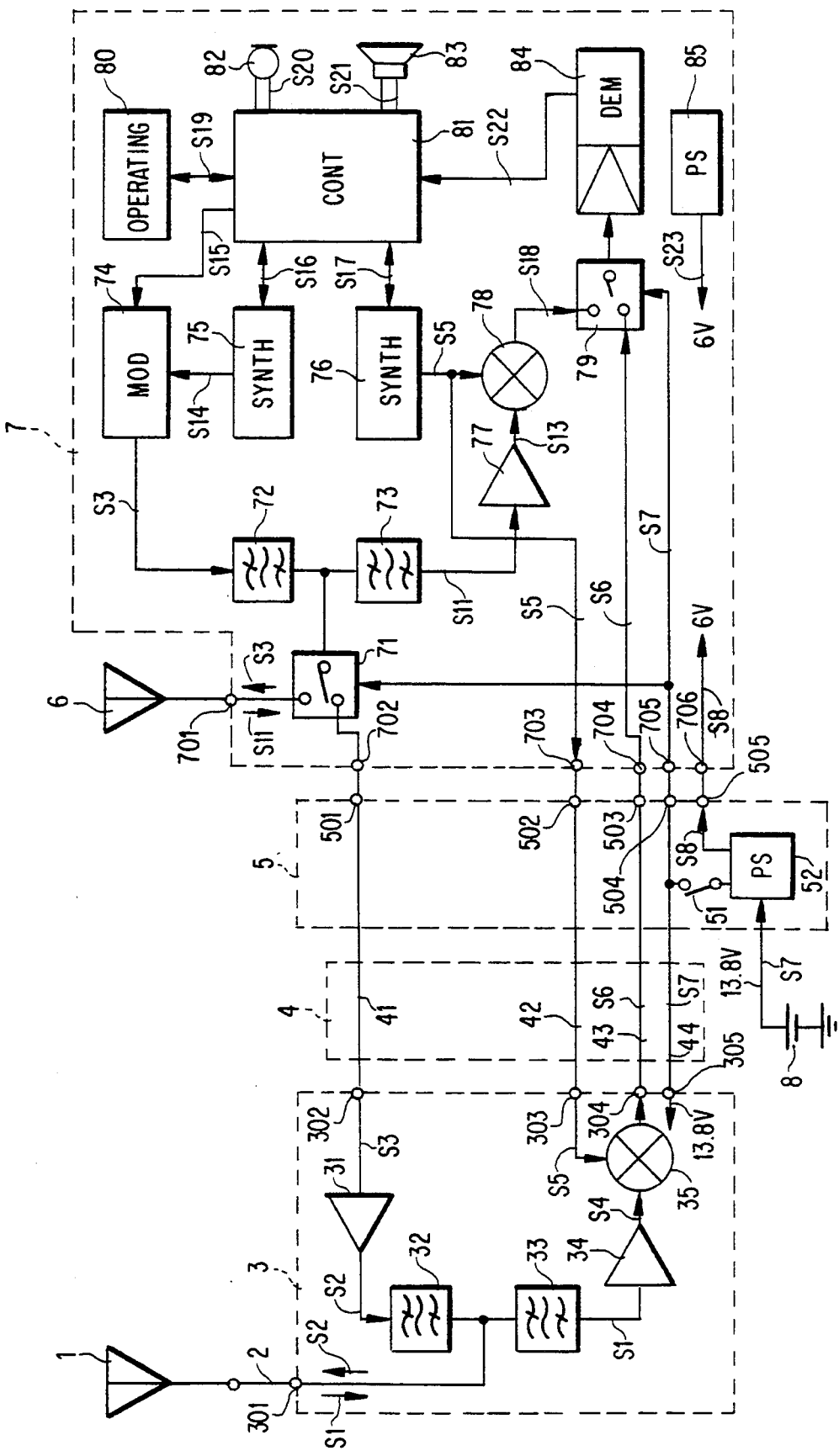
FIG. 1 is a block diagram schematically showing a car telephone embodying the present invention.

Referring to FIG. 1 of the drawings, a car telephone embodying the present invention is shown and includes a portable unit 7 and a telephone antenna 6 connected to an antenna terminal 701 which is included in the portable unit 7. The portable unit 7 and telephone antenna 6 constitute a mobile telephone set. A connection unit 5 is affixed to, for example, an armrest provided in a passenger compartment and supplied with the source output S7 of 13.8 volts from a car battery 8. When the portable unit 7 is connected to the connection unit 5 and a switch 51 incorporated in the connection unit 5 is turned on, the mobile telephone set changes into a car telephone. A car antenna 1 is mounted on, for example, the roof of the car while a power amplifier unit 3 is accommodated in, for example, the luggage compartment of the car. An antenna cable 2 connects the car antenna 1 and power amplifier unit 3 to each other. A flexible curled cord 4 connects the power amplifier unit 3 to the connection unit 5.

In a portable mode, a transmit signal S3 to be transmitted is delivered from the antenna terminal 701 of the portable unit 7 to the telephone antenna 6. The telephone antenna 6 converts the signal S3 to a first RF signal and then sends it to the base station of a mobile telephone system. A second RF signal different in phase from the first RF signal is radiated from the base station. The telephone antenna 6 converts the second RF signal to a received signal S11 and then applies in to the terminal 701. The portable unit 7 generates the transmit signal S3 on the basis of a transmitter signal S20 fed from a transmitter 82 or generates a receiver signal S21 on the basis of the received signal S11 and feeds it to a receiver 83.

The portable unit 7 has a modulator (MOD) 74 which generates the transmit signal S3 in response to a carrier signal S14 and a modulating signal S15 fed thereto from a frequency synthesizer (SYNTH) 75 and a controller (CONT) 81, respectively. The transmit signal S3 is applied to the antenna terminal 701 via a band pass filter 72 and one terminal of a switch 71 associated with the antenna 6. On the other hand, the received signal S11 from the antenna terminal 701 is fed to an amplifier 77 via the terminal of the switch 71 and a band pass filter 73. The band pass filters 72 and 73 constitute a duplexer for separating the signals S12 and S11 and are implemented as, for example, dielectric filters. The amplifier 77 amplifies the signal S11 to produce an amplified signal S13 and then delivers the signal S13 to a receiving mixer 78 which may be implemented as a transistor mixer. The receiving mixer 78 produces an IF signal S18 in response to the amplified signal S13 and a local oscillation signal S5 fed from a frequency synthesizer (SYNTH) 76. The IF signal S18 is routed through one of input terminals of a switch 79 to a demodulator (DEM) 84. In response, the demodulator 84 amplifies the IF signal S18 to a predetermined level, produces a demodulated signal S22 including the signal S21 and control signal from the amplified signal S18, and then feeds the signal S22 to the controller 81.

The controller 81 outputs the modulating signal S15 based on the transmitter signal S20 from the transmitter 82 or outputs, on receiving the demodulated signal S22, the receiver signal S21 to be fed to the receiver 83. Further, the controller 81 controls the channels of the frequency synthesizers 75 and 76 by use of channel control signals S16 and S17 and controls the call connection between the portable unit 7 and the base station (originating and terminating call connection) by use of the modulating signal S15 and demodulated signal S22. An operating section 80 has an input/output interface circuit for interfacing the portable unit 7 and the user of the telephone. The operating section 80 is connected to the controller 81 to interchange control signals S19 with the latter in the event of call processing or communication control. Specifically, the operating section 80 includes keys which may be operated by the user to enter control input signals, and a liquid crystal display (LCD) for displaying a telephone number of a desired remote station entered on the keys and various messages including the duration of a conversation. A battery package (PS) 85 applies a source output S23 of 6 volts to the various sections of the portable unit 7.

When a source output S7, i.e., a booster ON signal representative of the car-mounted mode is fed from the connection unit 5 to a booster ON signal receive terminal 705, the switch 71 of the portable unit 71 selects a booster signal terminal 702 so as to apply the transmit signal S3 from the band pass filter 71 to the terminal 702. At the same time, the source output S7 connects the input terminal of the switch 79 to an IF signal receive terminal 704, so that an IF signal from the terminal 704 may be routed to the demodulator 84. The demodulator 84 demodulates the IF signal S6 to thereby produce a demodulated signal S22. It is to be noted that the local oscillation signal S5 is constantly fed to a local oscillation signal output terminal 703.

In the car-mounted mode, a transmit signal S2 to be transmitted is fed to the car antenna 1 by way of an antenna terminal 301 included in the power amplifier unit 3 and a coaxial cable (e.g. G55A/U) or similar antenna cable 2. The car antenna 1 converts the transmit signal S2 to the previously mentioned first RF signal and sends it to the base station. On receiving the second RF signal from the base station, the car antenna 1 converts it to a received signal S1 and applies it to the antenna terminal 301. The transmit signal S3 from the terminal 702 of the portable unit 7 is fed to a terminal 302 included in the power amplifier unit 3 via the connection unit 5 and curled cord 4. In response, the power amplifier unit 3 amplifies the signal S3 by a power amplifier 31 to thereby produce the transmit signal S2. Further, the power amplifier unit 3 effects low noise amplification with the received signal S1, mixes the resulting received signal S4 with the local oscillation signal S5 fed thereto via the curled cord 4 and a local oscillation signal receive terminal 303, and then outputs the resulting IF signal S6 on an IF signal transmit terminal 304. The IF signal S6 is routed through the connection unit 5 to an IF signal receive terminal 705 included in the portable unit 7.

The curled cord 4 is implemented as a single cable which is about 5 meters long and made up of coaxial cables 41, 42 and 43 for the propagation of high frequency signals and each corresponding to 1.5D-2W, a power line 44 for feeding the source output S7, and control lines, not shown, for allowing the power amplifier unit 3 and portable unit 7 to interchange control signals. If desired, a connector may be affixed to both ends of the curled cord 4 to connect it to the power amplifier unit 3 and connection unit 5.

The connection unit 5 has a power supply (PS) 52 and a switch 51 for selectively connecting the source output S7 to a terminal 504. The power supply 52 allows the source output S7 of 13.8 volts from the car battery 8 to pass therethrough and converts the source output S7 to a source output S8 of 6 volts. The terminal 702 of the portable unit 7 is connected to the terminal 302 of the power amplifier unit 3 by the terminal 501 of the connection unit 5 and the coaxial cable 41 of the curled cord 4. Likewise, the terminals 703 and 502, coaxial cable 42 and terminal 303 are connected in series, the terminals 704 and 503, coaxial cable 43 and terminal 304 are connected in series, and the terminals 705 and 504, power line 44 and terminal 305 are connected in series. Further, the connection unit 5 includes a mechanism for removably connecting the portable unit 7 via the terminals 501–505 thereof and the terminals 702–706 of the portable unit 7. In this configuration, as the user connects the portable unit 7 to the connection unit 5 and then turns on the switch 51 of the unit 5, the source output S7 is applied to both the power amplifier unit 3 and the portable unit 7. On the connection of the portable unit 7 to the connection unit 5, the power source for the portable unit 7 is replaced with the source output S8 of 6 volts which is applied from the power supply 52 via the terminal 505 of the connection unit 5 and the terminal 706 of the portable unit.

In the power amplifier unit 3, the power amplifier 31 amplifies the transmit signal S3 input through the terminal 302 to produce the transmit signal S2. The transmit signal S2 is fed to the terminal 301 via a band pass filter 32. On the other hand, the received signal S1 from the terminal 301 is routed through a band pass filter 33 to a preamplifier 34. The band pass filters 32 and 33 constitute a duplexer for separating the transmit signal S2 and the received signal S1. The preamplifier 34 effects low noise amplification with the received signal S1 to produce a received signal S4. A transistor mixer or similar receiving mixer 35 outputs an IF signal S6 in response to the received signal S4 and the local oscillation signal S5 from the terminal 303. The IF signal S6 is delivered to the terminal 704 of the portable unit 7 via the terminal 304, coaxial cable 43, and the terminal 503 of the connection unit 5. The source output S7 fed to the power amplifier unit 3 via the terminal 305 is applied to the power amplifier 31, preamplifier 34, and receiving mixer 35.

Figure 2:
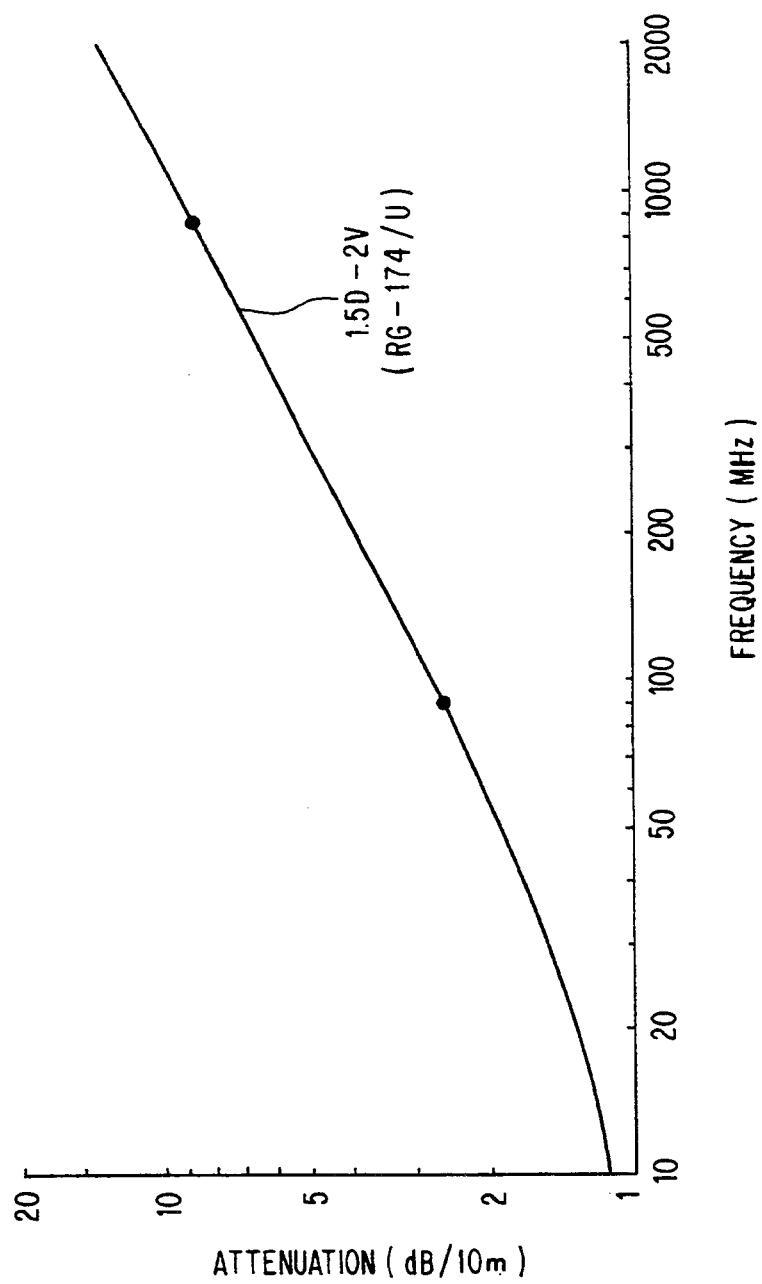
FIG. 2 is a graph showing a relation between the attenuation and the frequency particular to a coaxial cable (RG-174/U) 43 included in the embodiment.

Referring to FIG. 2, the coaxial cables implementing the cables 41, 42 and 43 of the curled cord 4 and corresponding to 1.5D-2 W (RG-174/U) suffer from a loss of about 4.3 dB per 5 meters when the frequency is 850 MHz, but the loss is not more than about 1.2 dB per 5 meters when it comes to 90 MHz which is the frequency of the IF signal S7. It has been customary with a power amplifier unit to use a preamplifier (corresponding to preamplifier 34) having a high gain in order to compensate for the loss of received signals ascribable to the coaxial cables and the loss ascribable to duplexers preceding and following the preamplifier. By contrast, since the coaxial cable 43 associated with the preamplifier 34 of the power amplifier unit 3 reduces the loss by about 3.1 dB, compared to the conventional power amplifier unit, and since the loss per duplexer is small, only the low noise characteristic can be pursued.

Figure 3:
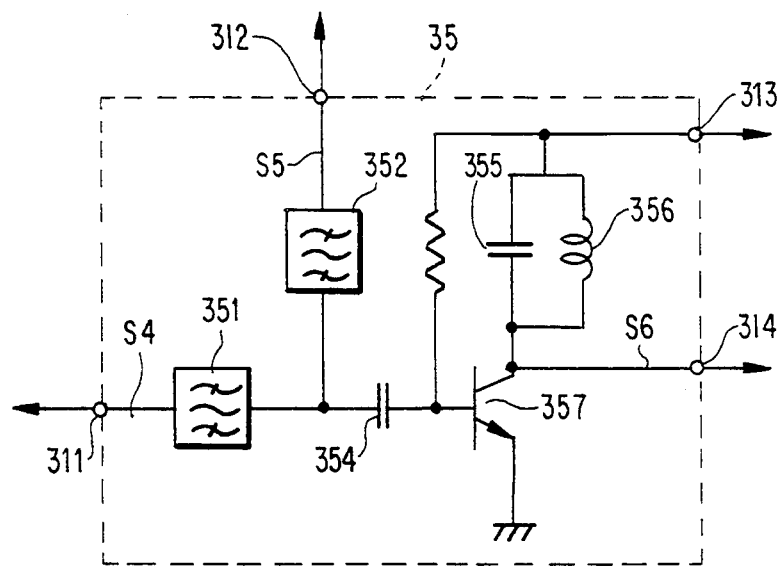
FIG. 3 is a circuit diagram showing a specific construction of a receiving mixer also included in the embodiment.

As shown in FIG. 3, the receiving mixer 35 outputs an IF signal S6 of about 90 MHz on a terminal 314 thereof in response to the received signal S4 lying in the 800 MHz band and arrived at a terminal 311 and the local oscillation signal S5 fed to a terminal 312 via the local oscillation signal receive terminal 303. More specifically, the received signal S4 is applied to the base of a transistor 357 via a band pass filter 351 implemented by, for example, a coaxial type filter. The local oscillation signal S5 lower in frequency than the received signal S4 by about 90 MHz is also applied to the base of the transistor 357 via a band pass filter 352 and a capacitor 354. By mixing the signals S4 and S5, the transistor 357 produces the IF signal S6 on the terminal 314 which is connected to the collector thereof. The transistor 357 is biased by the source output S7 of 13.8 volts applied to a terminal 313. Specifically, the terminal 313 is connected to the collector of the transistor 357 via a resonator made up of a capacitor 355 and an inductor 356 and is connected to the base of the transistor 357 via a resistor 353. The emitter of the transistor 357 is connected to ground.

The receiving mixer 78 of the portable unit 7 also has a construction represented by the circuit diagram shown in FIG. 3, except for the following points. Since the prerequisite with the receiving mixer 78 is low power consumption, the source voltage of 6 volts is applied to the terminal 313. Another prerequisite with the receiving mixer 78 is small size. For this reason, the band pass filters 351 and 352, FIG. 3, are implemented by dielectric filters or surface acoustic wave (SAW)-type filters which are miniature, although the loss will slightly increase. Conversely, the receiving mixer 35 of the power amplifier unit 3 receives a high voltage and can operate with a large current and may be somewhat bulky. This is successful in reducing intermodulation and losses during the course of IF signal generation.

Consequently, the car telephone can receive signals stably in the car-mounted mode operation.

Figure 4:
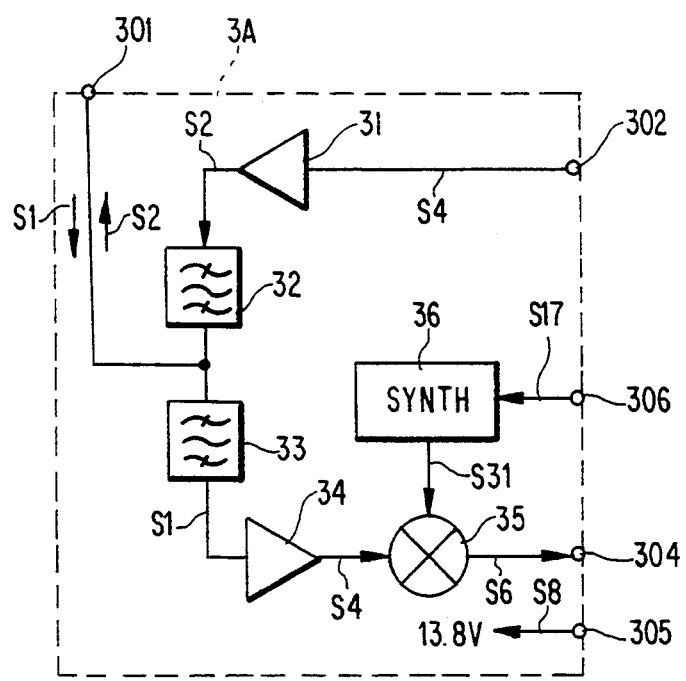
FIG. 4 is a block diagram schematically showing an alternative embodiment of the present invention.

FIG. 4 shows an alternative construction of the power amplifier unit. As shown, the power amplifier unit, generally 3A has a frequency synthesizer (SYNTH) 36 for feeding a local oscillation signal S31 to the receiving mixer 35, in addition to the constituent parts of the power amplifier unit 3, FIG. 1. The frequency synthesizer 36 functions in the same manner as the frequency synthesizer 76 of the portable unit 7. Therefore, the frequency synthesizer 36 is controlled by the channel control signal S17 fed from the controller 31 of the portable unit 7 to a terminal 306 to a frequency corresponding to the control signal S17. The control signal S17 is applied to the terminal 306 from the portable unit 7 by way of an extra coaxial cable included in the curled cord 4. The power amplifier unit 3A reduces the loss of the local oscillation signal S5 ascribable to the curled cord 4 of the embodiment of FIG. 1 and reduces the required power of the signal S5 to be generated by the frequency synthesizer 76 of the portable unit 7.

In summary, in the illustrative embodiment, the receiving mixer 35 is incorporated in the power amplifier unit 3 (or 3A) for converting the received signal S4 having undergone low noise amplification to the IF signal S6. The IF signal S6 is transferred to the portable unit 7 over the coaxiable cable 43. The embodiment, therefore, reduces the signal loss ascribable to the duplexer of the portable unit and noticeably reduces the transmission on the coaxial cable 43. This embodiment therefore eliminates the need for the compensation of the transmission loss ascribable to the various circuits of the power amplifier unit 3 and coaxial cable 43, whereby the gains and noise factors can be relatively freely allocated to the preamplifier 34, receiving mixer 35 and other circuits. Moreover, in the car-mounted mode, the embodiment reduces intermodulation distortions ascribable to the receiving mixer to thereby promote stable reception.

Although the invention has been described with reference to the specific embodiments, this description is not meant to be construed in a limiting sense. Various modifications of the disclosed embodiments, as well as other embodiments of the invention, will become apparent to persons skilled in the art upon reference to the description of the invention. It is, therefore, contemplated that the appended claims will cover any modifications or embodiments as fall within the true scope of the invention.

What is claimed is:

1. A car telephone comprising:

portable unit means;

telephone antenna means connected to said portable unit means for converting a received radio frequency (RF) signal received from a remote station to a first received signal while converting a first transmit signal to be transmitted to said remote station to a transmitted RF signal;

power amplifier unit means mounted on a car;

car antenna means connected to said power amplifier unit means for converting said received RF signal to a second received signal while converting a second transmit signal to be transmitted to said remote station to an RF signal for transmission;

connection unit means fixedly mounted on said car for removably connecting said portable unit means; and cord means for connecting said power amplifier unit means and said connection unit means;

said portable unit means comprising:

first frequency synthesizer means responsive to a first channel control signal for generating a carrier signal corresponding to said first channel control signal;

modulating means for generating said first transmit signal in response to a modulating signal and said carrier signal;

a booster ON signal receive terminal for receiving a booster ON signal representative of an ON state of said power amplifier unit means;

first switch means having one of two selection terminals connected to said telephone antenna means and the other selection terminal connected to a booster signal terminal for selecting said other selection terminal in response to said booster ON signal;

first duplexer means having a signal output terminal, a signal input terminal connected to said modulating means, and a signal input/output terminal connected to an output terminal of said first switch means for selecting said first transmit signal from said modulating means to output said first transmit signal on said signal input/output terminal or selecting said first received signal from said signal input/output terminal to output said first received signal on said signal output terminal;

second frequency synthesizer means responsive to a second channel control signal for generating a first local oscillation signal corresponding to said second channel control signal;

first received frequency mixing means for generating a first intermediate frequency (IF) signal in response to said first local oscillation signal and said first received signal from said first duplexer means;

demodulating means for producing a demodulated signal from said first IF signal;

control means for controlling call processing and communication between said portable unit means and the remote station, said control means including means for generating a receiver signal from said demodulated signal, means for receiving a transmitter signal to be converted to said modulating signal, and means for generating said first and second channel control signals; and operating means including input/output interface means for interfacing said portable unit means with an operator, and means for interchanging control signals with said control means during call processing and communication control;

said connection unit means comprising:

booster ON signal generating means for generating said booster ON signal; and a plurality of connection terminals to which connection terminals of said portable unit means including said booster signal terminal and said booster ON signal receive terminal are removably connected;

said cord means comprising connection lines and a high frequency signal transmission cable each corresponding to respective ones of said connection terminals of said portable unit means;

said power amplifier unit means comprising:

power amplifying means for generating said second transmit signal by amplifying said first transmit signal received from said booster signal terminal via said connection unit means and said cord means;

second duplexer means having a signal output terminal, a signal input terminal connected to said power amplifying means, and a signal input/output terminal connected to said car antenna means for selecting said second transmit signal from said power amplifying means to output said second transmit signal on said signal input/output terminal or selecting said second received signal from said signal input/output terminal to output said second received signal on said signal output terminal; and amplifying means for amplifying said second received signal selected;

said portable unit means further comprising:

an IF signal receive terminal for receiving a second IF signal having the same frequency as said first IF signal; and second switch means having one of two selection terminals connected to an output terminal of said first received frequency mixing means and the other selection terminal connected to said IF signal receive terminal for selecting said other selecting terminal in response to said booster ON signal;

said demodulating means also being connected to an output terminal of said second switch means for producing said demodulated signal from said second IF signal;

said power amplifier unit means further comprising second received frequency mixing means for producing said second IF signal in response to said second received signal having been amplified and a second local oscillation signal having the same frequency as said first local oscillation signal;

said connection unit means and said cord means transferring said second IF signal from said power amplifier unit means to said portable unit means.

2. A car telephone as claimed in claim 1, wherein said portable unit means further comprises means for transmitting said transmitter signal and means for receiving said receiver signal.

3. A car telephone as claimed in claim 1, wherein said second local oscillation signal comprises of said first local oscillation signal generated by said second frequency synthesizer means;

said portable unit means further comprises a local oscillation signal output terminal for outputting said first local oscillation signal;

said power amplifier unit means further comprises a local oscillation signal receive terminal for receiving said first local oscillation signal to be fed to said second received frequency mixing means;

said connection unit means and said cord means further comprising means for transferring said first local oscillation signal from said local oscillation signal output terminal to said local oscillation signal receive terminal.

4. A car telephone as claimed in claim 3, wherein said first and second received frequency mixing means each comprises a transistor mixer, said second received frequency mixing means being operated by a power source voltage higher than a voltage applied to said first received frequency mixing means.

5. A car telephone as claimed in claim 3, wherein said portable unit means further comprises a battery package for feeding, in a portable mode, power to said means constituting said portable unit means;

said connection unit further comprising:

power source means for converting the voltage of a car battery to a voltage equal to the voltage of said battery package and feeding the converted voltage to said portable unit means;

means for generating said booster ON signal when the connection of said car battery and one of said connection lines which should be connected to said booster ON signal receive terminal is brought into an ON state; and means for delivering the output of said car battery to said power amplifier unit means as a power source.

6. A car telephone as claimed in claim 1, wherein said portable unit means further comprises a channel control signal output terminal for outputting said second channel control signal;

said power amplifier unit means further comprising:

a channel control signal receive terminal for receiving said second channel control signal; and third frequency synthesizer means responsive to said second channel control signal for generating said second local oscillation signal corresponding to said second channel control signal;

said connection unit means and said cord means further comprising means for transferring said second channel control signal from said channel control signal output terminal of said portable unit means to said channel control signal receive terminal.

7. A car telephone as claimed in claim 6, wherein said first and second received frequency mixing means each comprises a transistor mixer, said second received frequency mixing means being operated by a power source voltage higher than a voltage applied to said first received frequency mixing means.

8. A car telephone as claimed in claim 6, wherein said portable unit means further comprises a battery package for feeding power to said means constituting said portable unit means;

said connection unit further comprising:

power source means for converting the voltage of a car battery to a voltage equal to the voltage of said battery package and feeding the converted voltage to said portable unit means;

means for generating said booster ON signal when the connection of said car battery and one of said connection lines which should be connected to said booster ON signal receive terminal is brought into an ON state; and means for delivering the output of said car battery to said power amplifier unit means as a power source.

9. A portable telephone set comprising:

telephone antenna connecting means for connecting a telephone antenna means, which converts a received radio frequency (RF) signal received from a remote station to a first received signal and converts a first transmit signal to be sent to said remote station, to a transmitted RF signal;

first synthesizer means responsive to a first channel control signal for generating a carrier wave corresponding to said first channel control signal;

modulating means for generating said first transmit signal in response to a modulating signal and said carrier signal;

a booster ON signal receive terminal for receiving a booster ON signal representative of an ON state of a power amplifier unit means which forms a booster for said portable telephone set;

first switch means having one of two selection terminals connected to said telephone antenna connecting means and the other selection terminal connected to a booster signal terminal for selecting said other selection terminal in response to said booster ON signal;

first duplexer means having a signal output terminal, a signal input terminal connected to said modulating means, and a signal input/output terminal connected to an output terminal of said first switch means for selecting said first transmit signal from said modulating means to output said first transmit signal on said signal input/output terminal or selecting said first received signal from said signal input/output terminal to output said first received signal on said signal output terminal;

second frequency synthesizer means responsive to a second channel control signal for generating a first local oscillation signal corresponding to said second channel control signal;

first received frequency mixing means for generating a first IF signal in response to said first local oscillation signal and said first received signal from said first duplexer means;

demodulating means for producing a demodulated signal from said first IF signal;

control means for controlling call processing and communication between said portable telephone set and said remote station, said control means including means for producing a receiver signal from said demodulated signal, means for receiving a transmitter signal to be converted to said modulating signal, and means for controlling the channels of said first and second frequency synthesizer means; and operating means including input/output interface means for interfacing said portable telephone set to an operator, and means for interchanging control signals with said control means during call processing and communication control;

said portable telephone further comprising:

an IF signal receive terminal for receiving a second IF signal having the same frequency as said first IF signal; and second switch means having one of two selection terminals connected to an output terminal of said first received frequency mixing means and the other selection terminal connected to said IF signal receive terminal for selecting said other selection terminal in response to said booster ON signal;

said demodulating means also being connected to an output terminal of said second switch means for producing said demodulated signal from said second IF signal.

10. A portable telephone set as claimed in claim 9, further comprising:

means for transmitting said transmitter signal; and
means for receiving said receiver signal.

11. A portable telephone set as claimed in claim 9, further comprising a local oscillation signal output terminal for outputting said first location oscillation signal.

12. A portable telephone set as claimed in claim 9, further comprising a channel control signal output terminal for outputting said second channel control signal.

13. A car telephone apparatus comprising:

cord means for passing at least a first received signal therethrough;

portable receiver antenna means for receiving an RF signal to produce a second received signal;

portable receiver means having a transmitter, a receiver and a local oscillator circuit and being connectable to said cord means and said portable receiver antenna means to selectively apply either said first or second received signal to said receiver;

car-mounted antenna means for receiving an RF signal to produce a third received signal;

amplifier means for amplifying said third received signal to produce an amplified signal; and means for frequency mixing said amplified signal and an oscillation signal output from said local oscillator circuit to produce and supply a frequency-down converted signal to said cord means as said first received signal when said portable receiver means is coupled to said frequency mixing means via said cord means.

* * * * *

UNITED STATES PATENT AND TRADEMARK OFFICE
CERTIFICATE OF CORRECTION

PATENT NO. : 5,369,803

DATED : November 29, 1994

INVENTOR(S) : Naoki HIRASAWA et al.

It is certified that error appears in the above-identified patent and that said Letters Patent is hereby corrected as shown below:

Col. 7, lines 13, delete "31" and insert --81--.

Signed and Sealed this

Eleventh Day of April, 1995

Attest:

BRUCE LEHMAN

Attesting Officer

Commissioner of Patents and Trademarks